United States Patent
Dutt et al.

(10) Patent No.: US 12,242,958 B2
(45) Date of Patent: Mar. 4, 2025

(54) MULTIDIMENSIONAL DATA ANALYSIS FOR ISSUE PREDICTION

(71) Applicant: ACCENTURE GLOBAL SOLUTIONS LIMITED, Dublin (IE)

(72) Inventors: Anindya Dutt, Delhi (IN); Kamalesh Kuppusamy Kuduva, Bangalore (IN); Prashanth Ramesh, Bangalore (IN); Siddesha Swamy, Bangalore (IN); Mohd Israil Khan, Noida (IN); Ankur Narain, Quezon (PH); Kumar Viswanathan, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1060 days.

(21) Appl. No.: 17/129,367

(22) Filed: Dec. 21, 2020

(65) Prior Publication Data

US 2022/0198259 A1    Jun. 23, 2022

(51) Int. Cl.
*G06N 3/08* (2023.01)
*G06N 3/04* (2023.01)
(Continued)

(52) U.S. Cl.
CPC .............. *G06N 3/08* (2013.01); *G06N 3/04* (2013.01); *G06N 5/04* (2013.01); *G06N 7/01* (2023.01); *G06N 20/00* (2019.01)

(58) Field of Classification Search
CPC ........ G06N 3/04; G06N 3/045; G06N 3/0464; G06N 3/0475; G06N 3/0495;
(Continued)

(56) References Cited

U.S. PATENT DOCUMENTS 10,127,438 B1    11/2018    Fisher et al.
2019/0019159 A1    1/2019    Champaneria
(Continued)

OTHER PUBLICATIONS

Abdulhammed et al. 2019 (Abdulhammed et al. 2019. "Features Dimensionality Reduction Approaches for Machine Learning Based Network Intrusion Detection" Electronics 8, No. 3: 322. pp. 1-27) https://doi.org/10.3390/electronics8030322 (Year: 2019).*

*Primary Examiner* — Abdullah Al Kawsar
*Assistant Examiner* — Tewodros E Mengistu
(74) *Attorney, Agent, or Firm* — Mannava & Kang, P.C.

(57) ABSTRACT

A system for issue prediction based on multidimensional data analysis includes a model generator that receives a resolved data item relating to a service issue. The resolved data item includes different attributes corresponding to multiple data dimensions and adjusts a population of attributes based on a statistical data model and a deep learning data model operating independent of each other. The statistical data model operates on the attributes for providing a predictive feature and the deep learning data model operates on the attributes for providing a predictive label based on performance metrics related to the data dimensions. The predictive feature and the predictive label collectively define training data. The model generator also trains a classification model based on the training data for predicting a potential issue related to an unresolved data item. The trained data model provides a trigger based on the potential issue being related to the performance metrics.

17 Claims, 9 Drawing Sheets

(51) Int. Cl.
*G06N 5/04* (2023.01)
*G06N 7/01* (2023.01)
*G06N 20/00* (2019.01)

(58) Field of Classification Search
CPC ...... G06N 3/0499; G06N 3/0455; G06N 3/08; G06N 3/088; G06N 3/0895; G06N 3/09; G06N 3/091; G06N 3/092; G06N 3/094; G06N 3/096; G06N 3/098; G06N 3/0985; G06N 5/04; G06N 7/01; G06N 20/00; G06Q 10/00; G06Q 10/02; G06Q 10/06312; G06Q 10/0639; G06Q 10/20
See application file for complete search history.

(56) References Cited

U.S. PATENT DOCUMENTS

| | | | |
|---|---|---|---|
| 2020/0167669 A1 | 5/2020 | Lei et al. | |
| 2020/0258013 A1* | 8/2020 | Monnett | H04L 41/5074 |
| 2020/0304364 A1* | 9/2020 | Tapia | G06N 7/01 |

* cited by examiner

700

702 Receive a resolved data item relating to a service issue, the resolved data item including a set of attributes corresponding to a plurality of predefined data dimensions, where the set of attributes relate to a historical resolution for the service issue, a category related to the service issue, a description of the service issue, an identity indicator, and a creation date with a first timestamp related to the resolved data item

704 Adjust a population of attributes in the set based on a plurality of data models including a statistical data model and a deep learning data model operating independent of each other, the statistical data model operating on the set for providing a predictive feature and the deep learning data model operating on the set for providing a predictive label based on predefined performance metrics related to the plurality of data dimensions, where the predictive feature and the predictive label collectively define training data

706 Train a classification model based on the training data, the trained model predicting a potential issue related to an unresolved data item, where the trained model provides a trigger based on the potential issue being related to the predefined performance metrics used for obtaining the training data

FIG. 7

MULTIDIMENSIONAL DATA ANALYSIS FOR ISSUE PREDICTION

BACKGROUND

Service events deviating from standard or expected business procedures or protocols are generally logged as "tickets" in a network environment. A ticket indicates a service issue and is typically attended by a helpdesk manager who manually allocates the ticket to an agent for resolution based on the availability, resourcefulness, and customer feedback received by the agent for a similar issue in the recent past. Such manual allocation of tickets based on a perceived skill of the agent or a mental memory of the manager often leads to delays and inaccuracies that violate corresponding performance metrics, thereby compromising satisfaction of the ticket issuer and business or service continuity.

Modern data systems employ machine learning models to automate or supplement such manual ticket allocation or resolution process with predictive analysis. These systems typically rely on the time elapsed since the creation of a ticket for its allocation or resolution. However, such a single-dimensional approach hinged only on temporal data leads to inconsistent allocations or resolutions, especially when the corresponding ticket issuer and the agent are located in different geographies. Moreover, these systems generally provide insights into inappropriate or untimely ticket closures only after the expected performance metrics are violated, thereby failing to remedy deficiencies of the manual allocation and/or resolution processes.

BRIEF DESCRIPTION OF DRAWINGS

The illustrated embodiments of the present disclosure will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 7 illustrates a method for implementing the system of FIG. 1, according to an example embodiment of the present disclosure.

DETAILED DESCRIPTION

Figure 1:
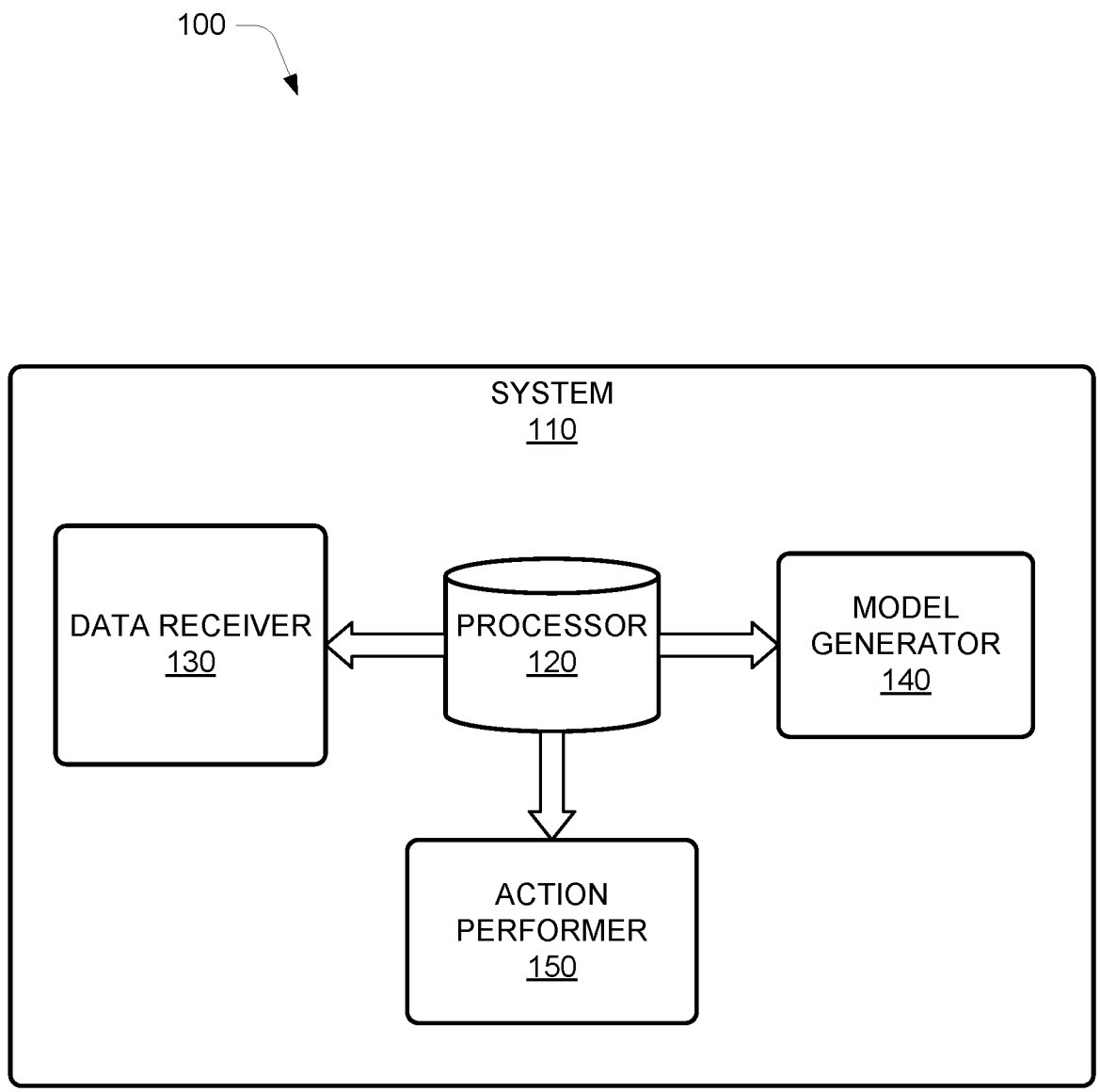
FIG. 1 illustrates a system to analyze multidimensional data for issue prediction, according to an example embodiment of the present disclosure.

For simplicity and illustrative purposes, the present disclosure is described by referring mainly to examples thereof. Examples of the present disclosure described herein may be used independently or together in different combinations. In the following description, details are set forth in order to provide an understanding of the present disclosure. It will be readily apparent, however, that the present disclosure may be practiced without limitation to any of these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments of the present disclosure describe for issue prediction based on multidimensional data analysis. In one example, the embodiments may be implemented using a system including a data receiver, a model generator, and an action performer. The data receiver may receive historical data such as a resolved data item relating to an issue. The resolved data item may include a set of attributes corresponding to multiple data dimensions, where the set of attributes may relate to a historical resolution for the service issue, a category related to the service issue, a description of the service issue, an identity indicator, and a creation date with a first timestamp related to the resolved data item. The data receiver may extract the attributes, or features related thereto, from the resolved data item and identify the corresponding data dimensions. The data receiver may also preprocess the resolved data item to identify, segregate, and normalize various attributes thereof for providing preprocessed data. The model generator may access the preprocessed data and predefined performance metrics related thereto. The model generator may include a distinct set of data models including a statistical data model and a deep learning data model for transforming the preprocessed data into metadata corresponding to the data dimensions based on the performance metrics. The distinct set of data models may independently operate on the preprocessed data to adjust, for example, reduce, a population of attributes therein. The statistical data model may operate on the set of attributes for providing one or more predictive features and the deep learning data model may operate on another copy of the set of attributes for providing one or more predictive labels based on the predefined performance metrics related to the data dimensions. The predictive features and the predictive labels may collectively define training data. The model generator may train a classification model using the training data. The trained data model may predict a potential issue related to an unresolved data item and may provide a trigger based on the potential issue being related to the predefined performance metrics used for obtaining the training data. The trained data model may accordingly classify the unresolved data item into a priority group related to the performance metrics in response to the trigger. Further, the action performer may perform a predefined action based on the trigger or the priority group associated with the unresolved data item. The predefined action may include configuring a data model for predicting a resolution for the potential issue, manipulating a position of the unresolved data item in a predefined queue, assigning a rank to the unresolved data item based on the priority group related thereto, communicating at least one of the potential issue and the unresolved data item to a predefined user or a predefined device, and initiating a predefined resolution associated with the priority group or the potential issue, or a combination thereof.

The present disclosure provides for a system to analyze multidimensional data for issue prediction. The present disclosure assists to predict a potential issue with input data, for example, an open or unresolved ticket, based on multiple data dimensions, instead of relying on a single data dimension, related therewith, thereby improving the accuracy of issue prediction as per preset metrics. The present disclosure may also prioritize the input data, or a resolution thereof, based on the corresponding data dimensions being related to the preset metrics before allocating, resolving, or closing the input data, thereby assisting to avoid delays, complaints, or escalations. The present disclosure may further assist to auto-check incoming or outgoing messages and provide auto-alerts to ensure satisfactory responses to the potential issue and/or the input data. Moreover, the present disclosure may assist to manipulate a position of the input data in a priority queue, adjust or assign a rank to the input data, initiate a preset resolution for the potential issue, and/or configure a data model for predicting a resolution for the potential issue to enable proactive management of intended service or process and minimize, or eliminate, any adverse impact due to service or process related disruptions. Accordingly, the present disclosure may assist to effectively analyze a data item, e.g., a service ticket; identify a data item requiring prioritization based on a potential issue, or corresponding priority groups, related thereto; provide a recommendation and/or a resolution regarding the prioritized data item based on a priority group related to the preset metrics; and provide a proactive notification or resolution for a data item per priority group related to the preset metrics. The present disclosure may thus provide a unique end-to-end solution to enhance customer satisfaction, raise productivity, and/or enable a proactive process improvement, for example, as a preventive action.

Embodiments are described in the context of service management. However, it will be appreciated that the embodiments and concepts described herein may be applied in other scenarios involving a relationship between an identification of a potential issue with data or content and a priority thereof for subsequent or required action. Examples of these scenarios include, but are not limited to, user-generated content management, search engine optimization, customer segmentation or targeting, churn prevention, market analysis, risk management, advertising and sales management, financial modeling and management, channel partner data management, logistics dispute management, and network security management.

FIG. 1 illustrates a system to analyze multidimensional data for issue prediction, according to an example embodiment of the present disclosure. The system 110 may be implemented by way of a single device or a combination of multiple devices that are operatively connected or networked to each other. The system 110 may be implemented in hardware or a suitable combination of hardware and software. As illustrated, the system 110 may be a hardware device including a processor 120 executing machine readable program instructions to, at least one of, communicate synchronously or asynchronously with one or more software applications, databases, storage devices, or appliances operating via same or different communication protocols, formats, database schemas, platforms or any combination thereof; receive, extract, or fetch input data, e.g., historical data and/or live data, having attributes corresponding to multiple data dimensions; extract features/attributes from the input data and identify the data dimensions related thereto; preprocess the input data to identify, segregate, and normalize various attributes thereof to provide preprocessed data; transform the preprocessed data into metadata corresponding to the data dimensions based on the preset metrics, for example, performance metrics; adjust a population of the attributes based on distinct types of data models operating independent of each other for providing training data as per the preset metrics; train a classification model based on the training data to provide a trained data model for predicting a potential issue related to the input data; provide a trigger based on the trained data model assessing the potential issue being related to the preset metrics used for obtaining the training data; classify the input data into a priority group related to the preset metrics based on the trigger, where the priority group may correspond to an age, an escalation, or a sentiment; and perform a predefined action based on the trigger, where the predefined action may be performed based on the priority group associated with the input data.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, the processor 120 may fetch and execute computer-readable instructions in a computer memory operationally coupled with the system 110 for performing tasks such as signal coding, data processing, power control, and/or any other functions. In one example, the processor 120 may be coupled to a data receiver 130, a model generator 140, and an action performer 150.

Figure 2:
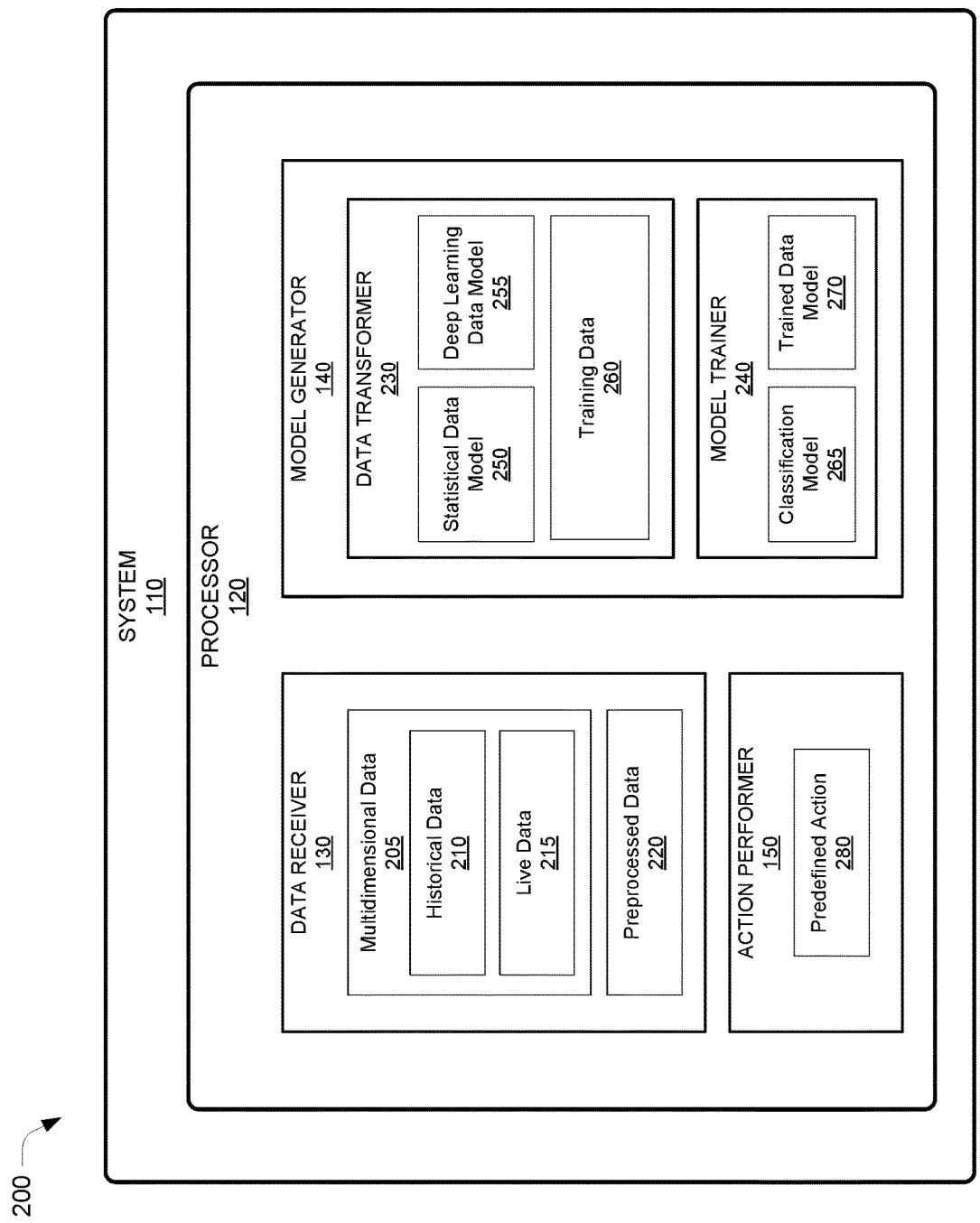
FIG. 2 illustrates components of the system of FIG. 1, according to an example embodiment of the present disclosure.

The data receiver 130 may correspond to a component for receiving the input data having attributes corresponding to one or more data dimensions. Examples of the data dimensions may include, but not limited to, temporal data, service data, text data, and performance data. In the present disclosure, a "data dimension" may refer to a type or category of data having a common or majority attribute corresponding to an intended process or service. In one example, as illustrated in FIG. 2, the data receiver 130 may receive multidimensional data 205, for instance, historical data 210 or live data 215, having attributes corresponding to multiple data dimensions. In the present disclosure, "historical data" may refer to a set of one or more data items associated with an outcome or a response for an issue related thereto. Further, in the present disclosure, "live data" may refer to a set of one or more data items unrelated to an outcome or a response for a potential issue related thereto. The outcome or response may be related to the preset metrics, for example, performance metrics. In the present disclosure, an "attribute" may refer to a term that qualifies or quantifies a data item, or a feature thereof. Examples of the attribute may include, but are not limited to, a service, a service category, an issue type or category, a creation date, a resolution pending duration, a user type, a sentiment indicator, a product size, a rating, a geographical indicator, and so on. In the present disclosure, a "feature" may refer to a term related to a data item. Examples of the feature may include, but are not limited to, an IT service; a delivery or a billing department; a payment pending notice or a return request; a creation timestamp; a time elapsed since the creation date; an agent role or designation; emoticons or feeling indicators; big, small, or medium; "5 stars," "FDA approved," "excellent," and so on. In some instances, the attribute may also correspond to a feature, or vice versa. However, other instances may include the attribute being distinct from the feature, or a type thereof. The data receiver 130 may also preprocess the input data to identify, segregate, and normalize various attributes.

The model generator 140 may correspond to a component for providing the trained data model, e.g., a trained data model 270, for predicting a potential issue related to the input data such as the live data 215. The model generator 140 may transform the received multidimensional data 205, or the preprocessed data such as preprocessed data 220, into metadata based on the preset metrics for providing training data 260. The metadata may correspond to the data dimensions related to the received input data. Further, the model generator 140 may employ distinct types of data models for simultaneously operating on the preprocessed data 220 for generating the training data 260. Moreover, the model generator 140 may train a classification model 265 based on the training data 260 for providing the trained data model 270, which may be distinct from the types of data models employed for obtaining the training data 260.

The action performer 150 may correspond to a component for predicting a potential issue related to the input data such as the live data 215 based on the trained data model 270, which may predict whether or not the potential issue may be related to the preset metrics, e.g., the performance metrics, and classify the input data, and/or the potential issue, into a priority group related to the preset metrics. Based on the classification, the trained data model 270 may provide a trigger for the action performer 150 to perform at least in-part a predefined action 280. In some examples, the action performer 150 may also activate, or operate with, another component to perform at least in-part the predefined action 280. In some other examples, the action performer 150 may cease to operate to with another component or device based on the trigger.

Further, as illustrated in FIG. 2, the system 110 may include one or more components that may provide the classification model 265 being trained based on at least two data dimensions associated with the input data such as the historical data 210. Such trained data model 270 may assist to predict a potential issue with the live data 215, and accordingly perform a predefined action 280 as per the preset metrics. For example, the system 110 may include the processor 120 operating, wholly or in part, a software application working alone or in conjunction with one or more hardware resources. Such software application may be executed by the processor 120 dedicatedly or in communication with different hardware platforms, or emulated in a virtual environment. Aspects of the system 110 may leverage known, related art, or later developed off-the-shelf software. Other embodiments may comprise the system 110 being in communication with a mobile switching center, network gateway system, Internet access node, application server, IMS core, service node, or any other type of communication systems, including any combinations thereof. In some embodiments, the system 110 may be implemented, wholly or in-part, as a movable device, wearable device, or a portable device. One having ordinary skill in the art would understand that the system 110 and/or the components described herein are examples and that similar or additional systems, devices, and/or components may be employed for performing functionalities disclosed in the present disclosure. The components including the data receiver 130, the model generator 140, and the action performer 150 are discussed in conjunction with an architecture 300 for the system 110 illustrated in FIG. 3. The architecture 300 provides a workflow for the components during operation. However, any other suitable architecture 300 may be contemplated based on the embodiments and concepts described in the present disclosure. It will also be appreciated that one or more of the components may operate in communication with each other irrespective of the workflow as illustrated, or otherwise, for performing any of the operations discussed herein.

In an embodiment, the data receiver 130 may be installed, integrated, or operatively associated with a user device (not shown) including any suitable computing device such as a desktop PC, a personal digital assistant (PDA), a server, a mainframe computer, a mobile computing device (e.g., mobile phones, laptops, etc.), an internet appliance (e.g., a DSL modem, a wireless access point, a router, a base station, a gateway, etc.), and so on. In some instances, the data receiver 130 may operate, or cease to operate, in response to a wearable or portable device including, but not limited to, a fashion accessory (e.g., a wrist band, a ring, etc.), a utility device (e.g., hand-held baton, a pen, an umbrella, a watch, an access card, etc.), a body clothing, or any combination thereof, present proximate, or remotely connected to, the data receiver 130 or the user device.

The data receiver 130 either in communication with any of the network devices such as the computing device or the processor 120, or dedicatedly, may have video, voice, or data communication capabilities (e.g., unified communication capabilities) by being coupled to or including, various sensors, a display device, or any other types of hardware, in any combination thereof. In some embodiments, the data receiver 130 may comprise or implement various real time protocols and non-real-time protocols known in the art, related art, or developed later to facilitate data transfer among the user device, the processor 120, or any other network devices such as a server (not shown). Further, the data receiver 130 may convert communications, which may include instructions, queries, data, files, etc., received from the sensors and/or the user device into appropriate formats to make such communications compatible with the network devices, and vice versa, and/or readable by a user. Consequently, the data receiver 130 may allow implementation of the network devices using different technologies or by different organizations, such as a third-party vendor, managing the server or associated services based on a proprietary technology.

The data receiver 130 may receive input data having attributes corresponding to one or more data dimensions. In one example, the input data may be multidimensional data 205 having attributes corresponding to more than one data dimensions including, but not limited to, temporal data, service data, text data, and performance data, or a combination thereof. The multidimensional data 205 may include a set of one or more data items, e.g., a service ticket, a message, a query, or a combination thereof. For such multidimensional data 205, the temporal data may include a creation date with a corresponding timestamp of at least one data item in the set and/or a resolution date with a corresponding timestamp for an issue related to at least one data item in the set. The service data may include a service process, a service category, a service sub-category, a service issue category, and/or a service issue sub-category related to at least one data item in the set. Further, the performance data may include a volume or a frequency of data items corresponding to the service issue, revenue data, and/or year-to-date (YTD) satisfaction data related to a user and/or an entity associated with at least one data item in the set. In the present disclosure, a "service ticket" or a "ticket" are used interchangeably and may refer to a message or an indicator of an incident pertaining to an intended service or a process. In some examples, the service ticket may also pertain to a user, a geographical indicator, and/or a device.

The data receiver 130 may receive the input data via any suitable interface(s), data repository, and/or components such as the user device coupled to the system 110 over a network (not shown). The interface(s) may include software interfaces (e.g., an application programming interface, a graphical user interface, etc.); hardware interfaces (e.g., cable connectors, a keyboard, a card reader, a barcode reader, a biometric scanner, an interactive display screen, sensors, etc.); or both. Such interface(s) may facilitate communication among various components and networked devices coupled to the system 110. Further, the data repository may include any suitable type of computer memory or data storing medium known in the art including, but not limited to, a Structured Query Language (SQL) database, a file system, a non-SQL database, a streaming application programming interface (API), and a cloud system. The network may include any software, hardware, or computer applications capable of providing a medium to exchange signals or data in any format known in the art, related art, or developed later. The network may include, but is not limited to, a website, a social media platform, a unified communication application, and a standalone application. Examples of the social media platform may include, but are not limited to, Twitter™, Facebook™, Skype™, Microsoft Lync™, Cisco Webex™, and Google Hangouts™. Further, the network may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (xDSL)), Wi-Fi, radio, television, cable, satellite, and/or any other delivery or tunneling mechanism for carrying data. The network may include multiple networks or sub-networks, each of which may include, e.g., a wired or wireless data pathway. The network may include a circuit-switched voice network, a packet-switched data network, or any other network configurable to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

Further, the system 110 may operate one or more components coupled thereto based on predefined or dynamically defined operational modes controlled at least in-part by the processor 120; however, these modes may be manipulated or selected from any of the components or network devices coupled to the processor 120. For example, a desired operational mode may be selected from the data receiver 130; however, other components, such as a user device and a server, coupled to the processor 120 may also be contemplated to select the desired operational mode. In an embodiment, the system 110 may operate in a training mode and a live mode. In the training mode, the processor 120 may communicate the historical data 210 as the multidimensional data 205 to the model generator 140 including a data transformer 230 and a model trainer 240 for processing. In some embodiments, the action performer 150 may be deactivated during the training mode. Similarly, in the live mode, the processor 120 may communicate the live data 215 as the multidimensional data 205 to the action performer 150 for processing. In some embodiments, the data transformer 230 and the model trainer 240 may be deactivated during the live mode. Other embodiments may include additional operational modes, for example, a testing mode that may be selected or controlled from a system component such as the data receiver 130 to operate or activate the action performer 150 and, at least in-part, the model generator 140 simultaneously for processing different types of multidimensional data 205, for example, the historical data 210 and/or the live data 215. However, in some embodiments, the multidimensional data 205 may be deemed to have different data types based on different types or combinations of data dimensions related thereto. In further embodiments, the system 110 may operate in one of preset or dynamically set communication modes in tandem with such operational modes, e.g., the training mode, the live mode, and/or the testing mode. In one example, the communication modes may include a push mode and a pull mode. In the push mode, the system 110 may operate to dynamically provide an indication or data to an output device coupled thereto. On the other hand, in the pull mode, such output device may dynamically initiate a sequential or parallel communication with one or more components coupled to the system 110 for obtaining or providing an intended indication or data. Examples of such indication may include numeric indications, alphanumeric indications, or non-alphanumeric indications such as vibrations, sounds, colors, luminance, patterns, textures, graphical objects, etc. perceivable through tangible indicators (e.g., light emitting diodes, vibrators, speakers, display device, etc.) or those displayable on the software interface(s), such as a dashboard on the display device, or any other suitable types of audio, visual, and haptic indications known in the art, related art, or developed later.

In an embodiment, the data receiver 130 may receive input data such as the historical data 210 during the training mode. The historical data 210 may include a set of one or more data items, for example, service tickets, relating to a service issue. In one example, each of the resolved data items may include a set of attributes corresponding to multiple data dimensions. The set of attributes may include or relate to a historical resolution for the service issue, a category related to the service issue, a short description of the service issue, an identity indicator (e.g., a ticket ID) and a creation date with a corresponding timestamp related to each resolved data item such as a resolved data item 310. In some embodiments, the resolved data item 310 may further include an associated assignment group; a detailed description of the service issue; a geographical indicator; a satisfaction indicator or general details (e.g., name, address, associated entity, department, etc.) of any such user or entity; and revenue-related details of the user or the entity, or any combinations thereof. The assignment group may include (i) an agent or a department which may have caused to historically resolve the service issue, (ii) a user or an entity who created or authorized the resolved data item 310, or (iii) a user or an entity experiencing the service issue. The entity may include, but is not limited to, a vendor, a customer, a service partner, and a supplier, or any combinations thereof.

The data receiver 130 may also receive preset metrics, for example, performance metrics, related to the resolved data items. The performance metrics may relate to a set of one or more threshold values and/or reference or standardization values related to the input data, or data dimensions thereof. The performance metrics may be predefined or dynamically defined for each of the data dimensions or attributes related to the input data. In an embodiment, the performance metrics may relate to an age, escalation metrics, or a sentiment associated with a data item. In the preset disclosure, an "age" may refer to a duration or time elapsed since the creation of a data item. Other embodiments may also include the performance metrics being related to various internal and external control objectives of a process or the entity. The internal control objectives may relate to the reliability of a service or process, timely update on the achievement of operational or strategic goals, and compliance with laws and regulations. For example, the internal control objectives may relate to, without limitation, (1) equipment (e.g., availability details, maintenance cycle, usage training, etc.), (2) people (e.g., technical skills, soft skills, positive or negative behaviors, key performance indicators, etc.), (3) policies (e.g., business hours, data access restriction, percentage of business travel, etc.), or any combination thereof. On the other hand, the external control objectives may relate to short-term and/or long-term implications of decisions made within an organization, or for an entity, on business goals. For example, the external control objectives may relate to, without limitation, (1) resource status (e.g., limited availability of essential inputs (including skilled labor), key raw materials, energy, specialized machinery and equipment, warehouse space, investment funds, etc.), (2) contractual obligations (e.g., labor contracts, product or service licenses, etc.), (3) expected process or service quality (e.g., audit scores, service level agreement adherence, business outcome indicators, etc.), (4) laws and regulations (e.g., minimum wage, health and safety standards, fuel efficiency requirements, anti-pollution regulations, fair pricing and marketing practices, etc.), or any combinations thereof.

The data receiver 130 may identify the data dimensions related to the historical data 210, extract features corresponding to the identified data dimensions, and preprocess the extracted features to provide the preprocessed data 220. The input data, for example, the historical data 210, may include one or more data dimensions such as the temporal data, the service data, the text data, and the performance data. The data receiver 130 may identify the data dimensions from the input data based on any of a variety of suitable techniques known in the art. In a first example, the data receiver 130 may determine the text data based on topic modeling techniques such as bag-of-words and n-gram models. The text data may correspond to a natural language text associated with the input data. The data receiver 130 may perform (i) text mining on a description (e.g., issue description, resolution or close notes, etc.) associated with the input data, in one example, for determining a related sentiment using a semantic dictionary based on context analysis techniques known in the art, and (ii) extract textual features (e.g., terms in the description), for example, using statistical feature models (e.g., tf-idf model, chi-square model, etc.) and reduce sparsity to a sub-process or a sub-category related to the input data in addition to the category associated therewith. In a second example, the data receiver 130 may determine the temporal data using any of the timeseries forecasting techniques known in the art including Neural Network Timeseries Forecast (NNET), Autoregressive Integrated Moving Average (ARIMA), and Neural Network with lagged version of timeseries (NNETAR). The temporal data may relate to volume drivers of a user or an entity with a process and related categories. In the present disclosure, a "volume driver" may refer to a common or majority attribute across multiple data items in the input data, such as the historical data 210. The data receiver 130 may determine the temporal data in the future state for accurately predicting related service issues, for example, by estimating the volume drivers across multiple processes and categories using multiple timeseries forecasting techniques, followed by ensemble modelling techniques to select a best performing model for predicting future states of the volume drivers. Examples of the ensemble modeling techniques may include, but are not limited to, stacking, blending, bagging, and boosting. Ensemble modelling may accordingly allow to aggregate a prediction of each base model (e.g., a timeseries forecasting model) and select the best performing model basis the performance of base models for resulting in operations that extract features of the preprocessed data 220 from the volume drivers across multiple processes and categories.

Further, in a third example, the data receiver 130 may determine the service data related to a data item based on service indicators such as a service category, a service process, sales numbers, purchase orders, and year-to-date (YTD) inflow of similar or related data items. In some instances, the service data may assist to determine key entities related to the input data. In the present disclosure, "key entities" may refer to a set of one or more entities whose related data item may need to be prioritized, for example, irrespective of the preset metrics, such as the performance metrics, for an intended service or process. The data receiver 130 may derive the service data based on a past performance of the related data items, for example, indicated by states or values of the service indicators, across all categories or types (e.g., entity identifiers, order values, revenue, sales, etc.) related to each of the data items in the input data. Accordingly, the data receiver 130 may employ any of the variety of techniques known in the art, related art, or developed later for extracting features related to specific domains or categories based on past track trends (e.g., a YTD frequency or a total number of data items till date related to a specific category) and the related states of performance indicators (e.g., a frequency; a total number; or a required or a minimum accuracy value being above the respective threshold values) upon resolution. In a fourth example, the data receiver 130 may determine the performance data, for example, related to satisfaction indicators or scores, audit scores, business outcome indicators, revenue indicators of each entity related to a data item based on the performance metrics. The data receiver 130 may extract such features related to the performance data using any of the feature extraction techniques known in the art, related art, or developed later.

Further, the data receiver 130 may accordingly preprocess the received input data, e.g., the historical data 210 during the training mode, using any of a variety of preprocessing techniques known in the art, related art, or developed later based on the type of attributes therein. In one example, the data receiver 130 may segregate or map the extracted features into numerical attributes and categorical attributes as per respective preset metrics, for example, the performance metrics. For each of the attributes, and features related thereto, the data receiver 130 may (i) adjust for skewed data for eliminating any outliers, for example, based on log-transformation techniques or any other suitable techniques, to obtain a log-normal or near normal distribution of such attributes and features, (ii) determine or forecast future states of the attributes, for example, based on simple moving averages or autoregressive integrated moving average (ARIMA), for their evaluation against the respective preset metrics, (iii) binning of numerical attributes, or features, per mapping to reduce data complexity and normalization, (iv) obtain numerical representations of the categorical attributes, for example, based on dummy encoding or one-hot encoding techniques, for statistical analysis, (v) normalize the natural language text, for example, based on sentence tokenization, word tokenization, lemmatization, stemming, stop word removal, spell-check, special character removal, and part-of-speech (POS) tagging, or any other suitable techniques, to remove portions such as spacings and redundancies irrelevant for analysis, and/or (vi) normalize the attributes using data sufficiency and accuracy threshold techniques known in the art. The preprocessed data 220 related to the input data, e.g., the historical data 210 such as the set of one or more resolved data items, may be sent by the data receiver 130 to the model generator 140 during the training mode.

Figure 4:
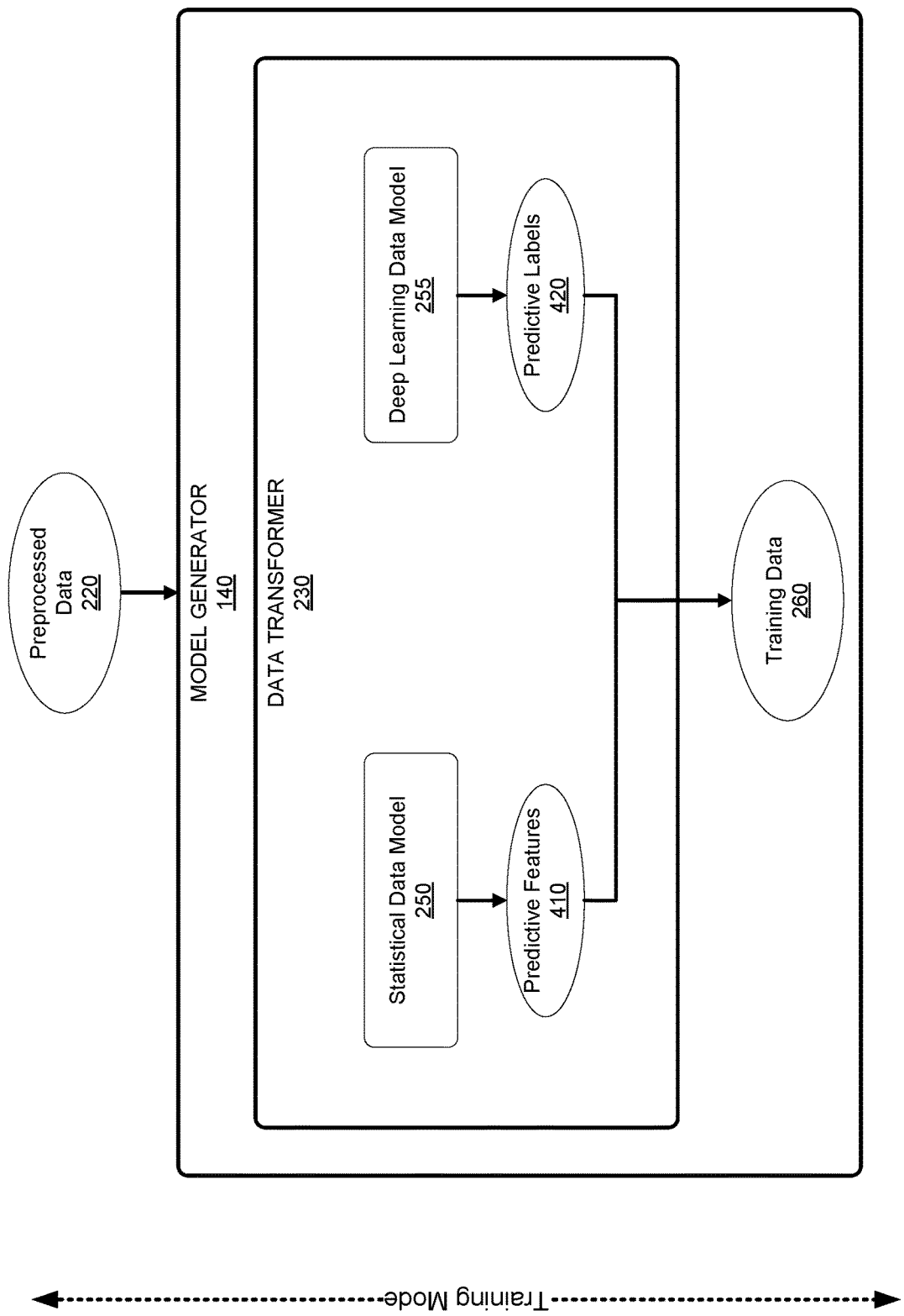
FIG. 4 illustrates a multidimensional data analysis for providing training data during a training mode of the system of FIG. 1, according to an example embodiment of the present disclosure.

The model generator 140 may receive the preprocessed data 220 and the related preset metrics, for example, the performance metrics to provide a trained data model 270. The preprocessed data 220 may be used to generate the training data 260 required for training an intended data model, for example, the classification model 265, discussed below in further detail. The model generator 140 may be coupled to one or more components including a data transformer 230 and a model trainer 240. The data transformer 230 may correspond to a component for transforming the received preprocessed data 220 into the training data 260 based on (i) the data dimensions operating as metadata and (ii) the preset metrics related thereto. As illustrated in FIG. 4, the data transformer 230 may feed the received preprocessed data 220, or related data dimensions, as metadata to a set of distinct data models operating independent of each other. This set of data models may cluster or group various attributes or features associated with the historical data 210 based on unsupervised learning techniques. In an embodiment, the data transformer 230 may implement these unsupervised learning techniques by employing a combination of a statistical data model 250 and a deep neural network data model 255 (or deep learning data model 255). Both the statistical data model 250 and the deep learning data model 255 may operate simultaneously on separate copies of the preprocessed data 220. Such stacking of a traditional machine learning model (e.g., the statistical data model 250) with a neural network data model (e.g., the deep learning data model 255) provides for optimal unsupervised learning techniques during a deterministic averaging and a grid search optimization respectively, discussed below in greater detail, for improving the accuracy of the trained data model 270.

In an example, the statistical data model 250 may be implemented as a statistical dimension reduction model, such as a principal component analysis (PCA) model providing a linear transformation, to adjust a number of attributes related to the data dimensions in the preprocessed data 220, thereby representing the preprocessed data 220 with a different number of attributes or data dimensions. For example, the preprocessed data 220 may include 2000 features corresponding to each of the ten thousand resolved service tickets for a total of 10000×2000 features therein. The PCA model may operate on the feature vectors, or component vectors, to reduce them to a set of 10000×200 features based on the deterministic averaging of features related to the performance data (e.g., satisfaction indicators or scores, audit scores, business outcome indicators, revenue indicators, etc.) as per the respective preset performance metrics. The reduced number of features provided as a first output by the dimension reduction model may operate as priority features 410, hereinafter referred to as predictive features 410, which may be deemed most relevant for the training data 260 or most representative of the all the extracted features in the preprocessed data 220.

In another example, the deep learning data model 255 may be implemented as a neural network dimension reduction model, such as a partial autoencoder, to adjust the number of categories or groups related to the extracted features (or data dimensions) in the preprocessed data 220, thereby representing the preprocessed data 220 with a different number of categories or types. For example, the partial autoencoder may implement an encoder as the neural network dimension reduction model. The encoder may reduce or compress the 10000×2000 features corresponding to the extracted features of the preprocessed data 220 in the above example into 10000×5 labels by focusing on categories of only the common or majority attributes or features related to the performance data (e.g., satisfaction indicators or scores, audit scores, business outcome indicators, revenue indicators, etc.) as per the respective preset performance metrics. The reduced number of labels provided as a second output by the neural network dimension reduction model may operate as priority labels 420, hereinafter referred to as predictive labels 420, which may be deemed most relevant for the training data 260 or most representative of the all the labels or categories in the preprocessed data 220. The partial autoencoder, or the encoder, may model complex non-linear functions for employing a grid search to stack multiple layers of data for creating the priority labels 420, or predictive labels 420, requiring focus relative to the other categories as per the performance metrics. The grid search may assist to create a generalized model based on a hyper parameter training of an optimizer, e.g., related to a technique of adaptive moment estimation (also, referred to as "Adam"), to iterate the neural network parameters such as batch size, epochs, weights, and/or learning rate for improving the accuracy of predictive labels 420 per the performance metrics. In some examples, the partial autoencoder, or the encoder, may be operated to provide a set of labels or at least one label from each of the data dimensions during the compression of features to yield the predictive labels 420, thereby dropping a feature regenerating portion of decoder from an autoencoder. In some other examples, the predictive labels 420 may relate to labels or categories corresponding to the predictive features 410. The predictive labels 420 and the predictive features 410 may collectively define the training data 260, which may be sent to the model trainer 240 by the data transformer 230.

Figure 5:
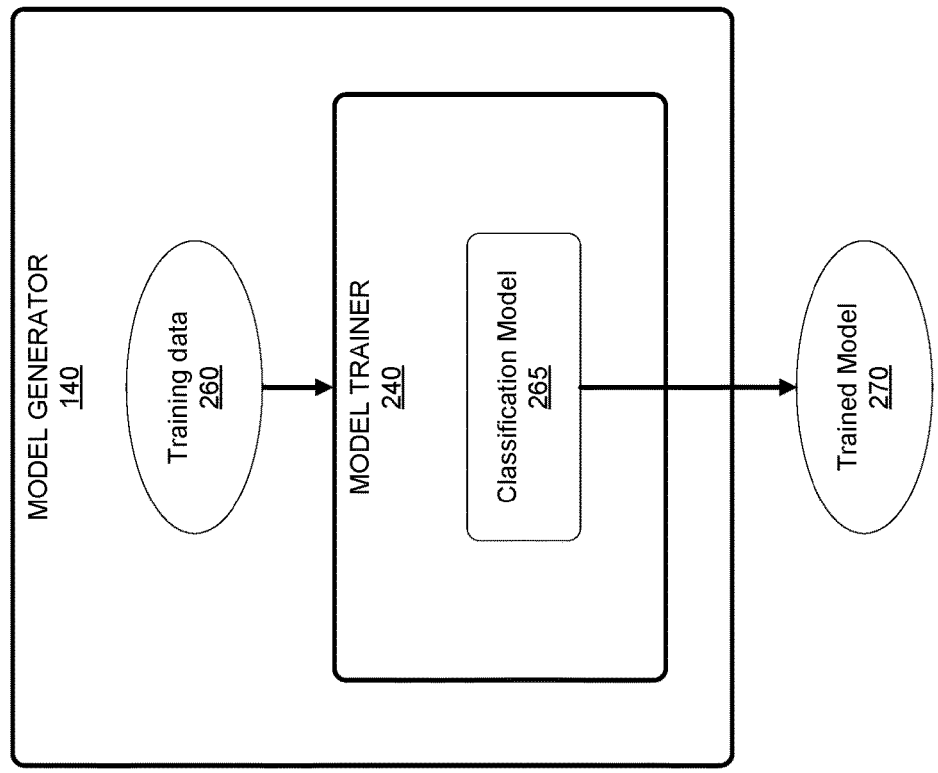
FIG. 5 illustrates a training of a data model by the system of FIG. 1, according to an example embodiment of the present disclosure.

The model trainer 240 may correspond to a component for training the classification model 265, for example, a statistical classifier, based on the training data 260. As illustrated in FIG. 5, the trained data model 270 may operate to predict a potential issue corresponding to the input data received during the live mode. The model trainer 240 may implement the classification model 265 operating as a decoder to the partial autoencoder implemented with the data transformer 230. The classification model 265 may be trained based on the training data 260 using supervised learning techniques.

The classification model 265 may be preset or dynamically set to include any suitable classification model known in the art, related art, or developed later. In an example, the classification model 265 may be implemented as a statistical classification model 265 such as a stochastic gradient descent (SGD) classifier. Other examples may include a combination of the statistical classification model 265 and a probabilistic classification model known in the art, related art, or developed later. In an embodiment, the model trainer 240 may train the SGD classifier based on the predictive features 410 (e.g., dimensionally reduced features) and the predictive labels 420 (e.g., encoded labels). The trained data model 270 operates to assist in predicting a potential issue, or a category related thereto, with the input data during the live mode. The model trainer 240 may send the trained data model 270 to the action performer 150, or store the trained data model 270 in the data repository for being accessed by the action performer 150 or any other component operationally coupled to the system 110.

Figure 3:
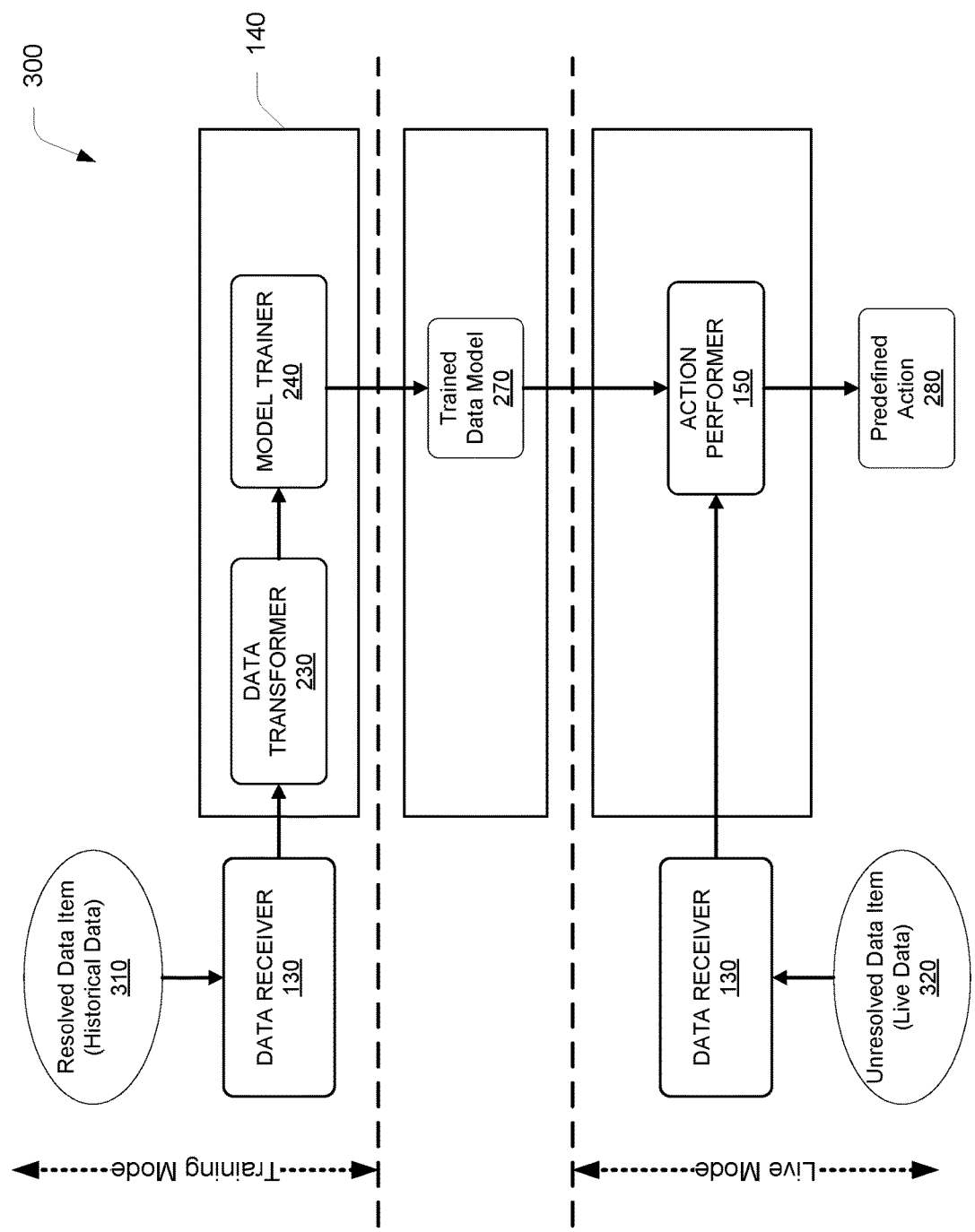
FIG. 3 illustrates a flow architecture for the system of FIG. 1, according to an example embodiment of the present disclosure.

As illustrated in FIG. 3, the data receiver 130 may receive the input data during the live mode. The input data may correspond to live data, such as the live data 215, including a set of attributes. In one example, the attributes may correspond to one or more data dimensions such as those discussed above. The live data 215 may be unrelated to an outcome or a response for a potential issue related thereto. In one instance, the live data 215 may include a set of one or more unresolved data item 320 including a set of attributes corresponding to multiple data dimensions. The set of attributes may include a short description, an identity indicator (e.g., a ticket ID, a message ID, a query ID, etc.), and a creation date with the corresponding timestamp related to each of the unresolved data item 320. In some embodiments, the unresolved data item 320 may further include an associated assignment group; revenue-related details of a user or an entity, or any combinations thereof. The data receiver 130 may identify the data dimensions related to the live data 215, extract features corresponding to the identified data dimensions, and preprocess the extracted features to provide the preprocessed data 220, as discussed above. The input data, for example, the live data 215, may include the attributes corresponding to multiple data dimensions such as the temporal data (e.g., creation date), the service data (e.g., service category, department, etc.), the text data (e.g., a short or a long description in a natural language, etc.), and the performance data (e.g., satisfaction indicators, revenue indicators, etc.). The preprocessed data 220 may be sent to the action performer 150 by the data receiver 130.

The action performer 150 may receive the preprocessed data 220 corresponding to the live data 215 including at least one unresolved data item 320. The preprocessed data 220 may be assessed by the action performer 150 based on the trained data model 270 to predict a potential issue associated with the received input data. When the values of extracted attributes or features pertaining to multiple data dimensions in the preprocessed data 220 exceed the respective threshold values in the performance metrics, the trained data model 270 may predict that a data dimension(s) corresponding to such features relate to a potential issue. The trained data model 270 may accordingly classify the input data, or the corresponding data items therein, into one or more of the priority groups predefined or dynamically defined based on the performance metrics. For example, the priority groups may correspond to, without limitation, an age, escalation metrics, and a sentiment related to the performance metrics. In one instance, when the potential issue may be predicted as being related to the temporal data, the trained data model 270 may classify the unresolved data item 320 and the related feature(s) into an age priority group. In another instance, when the potential issue may be predicted as being related to the service data, the text data, and/or the performance data, the trained data model 270 may classify the unresolved data item 320 and the related feature(s) into at least one of an escalation priority group and a sentiment priority group. In yet another instance, when the potential issue may be predicted as being related to the text data and/or the performance data, the trained data model 270 may classify the unresolved data item 320 and the related feature(s) into at least one of the escalation priority group and the sentiment priority group, and so on. Based on the classification, the trained data model 270 may provide a trigger for the action performer 150 to perform a predefined action 280. Examples of the predefined action 280 may include, but are not limited to, configuring a data model for predicting a resolution for the potential issue based on the extracted attributes or features as per the respective performance metrics, manipulating a position of the unresolved data item 320 in an item queue such as a priority queue and/or a data repository, adjusting an existing rank of or assigning a new rank to the unresolved data item 320 in any such queues or the data repository, providing an auto-alert indication regarding the unresolved data item 320, or the potential issue, to a predefined agent or a predefined device, and initiating a predefined resolution associated with the potential issue or a data dimension related thereto. In some examples, the predefined action 280 may be performed based on a priority group or a combination of priority groups associated with the unresolved data item 320.

Figure 6:
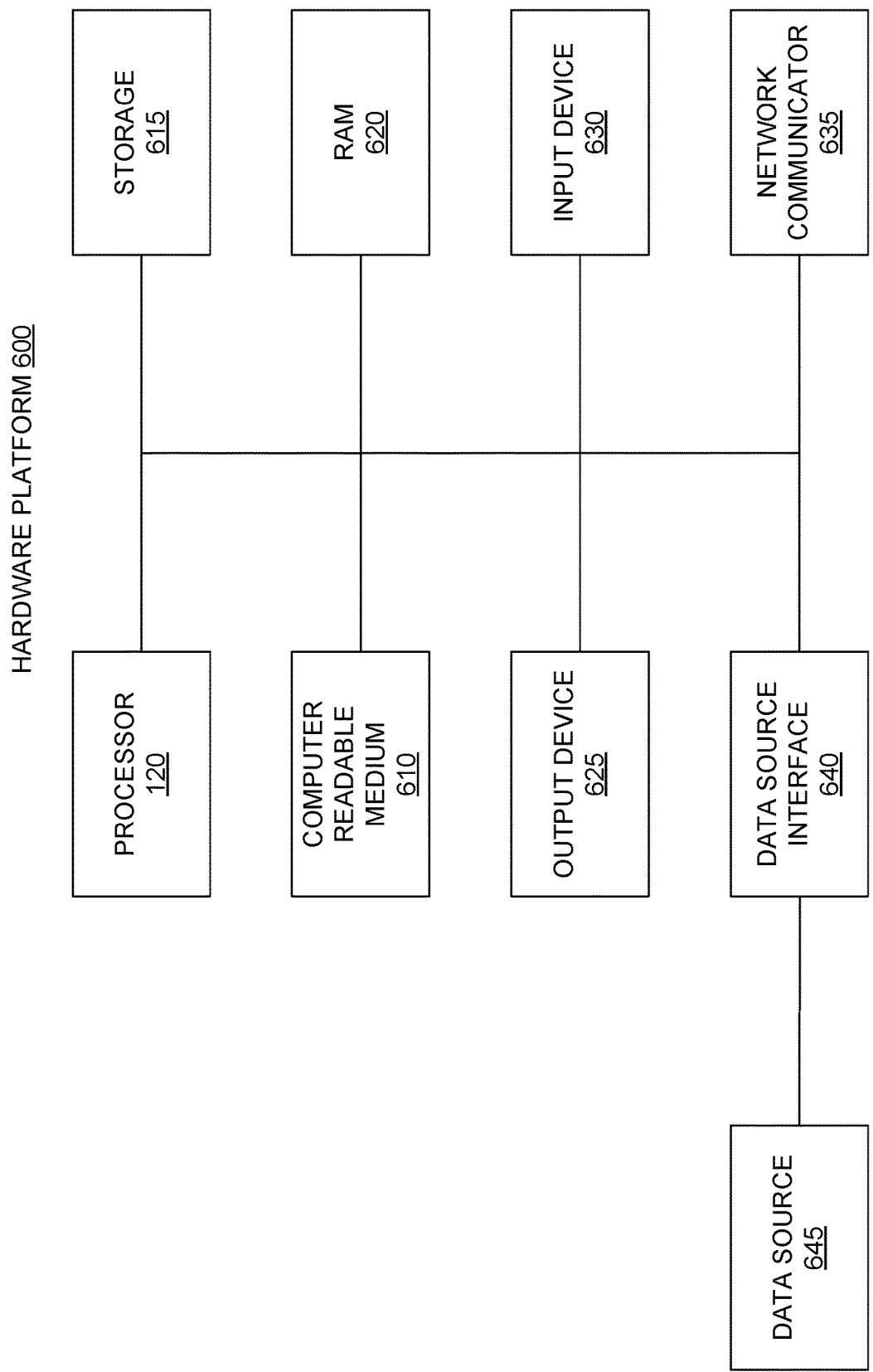
FIG. 6 illustrates a hardware platform for an implementation of the system of FIG. 1, according to an example embodiment of the present disclosure.

FIG. 6 illustrates a hardware platform 600 for the implementation of the system 110 of FIG. 1, according to an embodiment of the present disclosure. For the sake of brevity, construction and operational features of the system 110 which are explained in detail above are not explained in detail herein; particularly, computing machines such as but not limited to internal/external server clusters, quantum computers, desktops, laptops, smartphones, tablets, and wearables which may be used to execute the system 110 or may have the structure of the hardware platform 600. As illustrated, the hardware platform 600 may include additional components not shown and that some of the components described may be removed and/or modified. For example, a computer system 110 with multiple GPUs may be located on external-cloud platforms including Amazon Web Services, or internal corporate cloud computing clusters, or a combination thereof with organizational computing resources, and so on.

The hardware platform 600 may be a computer system 110 such as the system 110 that may be used with the embodiments described herein. For example, the computer system 110 may represent a computational platform that includes components that may be in a server or another computer system 110. The computer system 110 may execute, by a processor such as the processor 120 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 110 may include the processor 120 that executes software instructions or code stored on a non-transitory computer-readable storage medium 610 to perform methods of the present disclosure. The software code includes, for example, instructions to gather data and documents and analyze documents. In an example, the data receiver 130, the model generator 140, and the action performer 150 may be software codes or components performing these steps.

The instructions on the computer-readable storage medium 610 are read and stored the instructions in storage 615 or in random access memory (RAM) 620. The storage 615 may provide a space for keeping static data where at least some instructions could be stored for later execution. The stored instructions may be further compiled to generate other representations of the instructions and dynamically stored in the RAM such as RAM 620. The processor 120 may read instructions from the RAM 620 and perform actions as instructed.

The computer system 110 may further include an output device 625 to provide at least some of the results of the execution as output including, but not limited to, visual information to users, such as external agents. The output device 625 may include a display on computing devices and virtual reality glasses. For example, the display may be a mobile phone screen or a laptop screen. GUIs and/or text may be presented as an output on the display screen. The computer system 110 may further include an input device 630 to provide a user or another device with mechanisms for entering data and/or otherwise interact with the computer system 110. The input device 630 may include, for example, a keyboard, a keypad, a mouse, and/or a touchscreen. Each of the output device 625 and the input device 630 may be operationally coupled by one or more additional peripherals. For example, the output device 625 may be used to display results of the data receiver 130, the model generator 140, and/or the action performer 150.

A network communicator 635 may be provided to connect the computer system 110 to a network and in turn to other devices connected to the network including other clients, servers, data stores, and interfaces, for instance. A network communicator 635 may include, for example, a network adapter such as a LAN adapter or a wireless adapter. The computer system 110 may include a data source interface 640 to access any data source such as a data source 645, which may be an information resource. As an example, a database of exceptions and rules may be provided as the data source 645. Moreover, knowledge repositories and curated data may be other examples of the data source 645.

FIG. 7 illustrates a method for implementing the system 110 of FIG. 1, according to an example embodiment of the present disclosure.

The method 700 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 700 is described is not intended to be construed as a limitation, and any number of the described method blocks may be combined or otherwise performed in any order to implement the method 700, or an alternate method. Additionally, individual blocks may be deleted from the method 700 without departing from the spirit and scope of the present disclosure described herein. Further, the method 700 may be implemented in any suitable hardware, software, firmware, or combination thereof, that exists in the related art or that is later developed.

The method 700 describes, without limitation, an implementation of the system 110. A person of skill in the art will understand that the method 700 may be modified appropriately for implementation in various manners without departing from the scope and spirit of the present disclosure. The method 700 may be implemented, in at least some embodiments, by the contextual memory trainer 140 of the system 110. For example, the model generator 140 may use the processor 120 to execute computer instructions to perform operations for issue prediction based on analysis.

Figure 8:
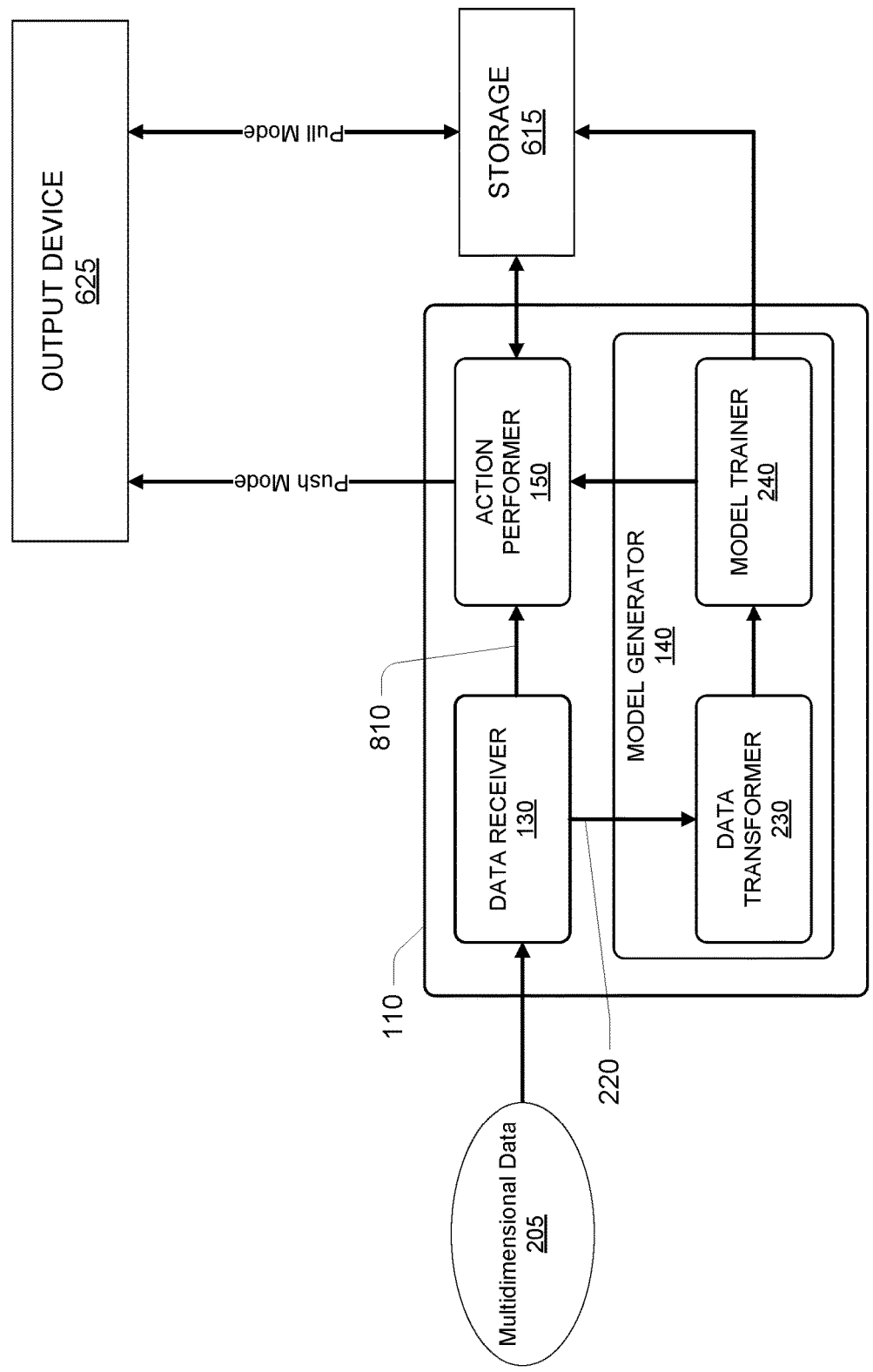
FIG. 8 illustrates different modes for implementing the system of FIG. 1, according to an example of the present disclosure.

At step 702, a resolved data item relating to a service issue may be received by the model generator 140. As illustrated in FIG. 8, the data receiver 130 may receive multidimensional data such as the historical data 210 during a training mode. The historical data 210 may include a resolved data item such as the resolved data item 310 (e.g., a service ticket, a received message, a sent message, a query, or a combination thereof) related to a service issue. The resolved data item 310 may include a set of attributes corresponding to multiple data dimensions. The set of attributes may relate to a historical resolution for the service issue, a category related to the service issue, a description of the service issue, an identity indicator, and a creation date with a first timestamp related to the resolved data item 310. In some embodiments, the resolved data item 310 may also include attributes related to a resolution date with a corresponding timestamp and an assignment group. The resolved data item 310 may be preprocessed by the data receiver 130 to identify, segregate, and normalize various attributes thereof to provide the preprocessed data 220, instead of raw input data, to the model generator 140.

At step 704, a population of attributes in the set may be adjusted. In an embodiment, the preprocessed data 220 may be received by the data transformer 230 in the model generator 140 for adjusting a population of attributes in the preprocessed data 220. For example, the data transformer 230 may reduce the population of attributes in the preprocessed data 220 using a set of distinct data models including a statistical data model 250 and a deep learning data model 255 operating based on unsupervised learning techniques. The set of data models may operate independent of each other. The statistical data model 250 may operate on the set of attributes in the preprocessed data 220 for providing one or more priority features or predictive features 410. The deep learning data model 255 may operate on another copy of the set of attributes in the preprocessed data 220 for providing one or more priority labels or predictive labels 420. Both the statistical data model 250 and the deep learning data model 255 may operate on the respective copies of preprocessed data 220 parallelly or simultaneously based on predefined performance metrics related to the data dimensions in the preprocessed data 220. These distinct data models, for example, the statistical data model 250 and the deep learning data model 255, may transform the preprocessed data 220 into metadata corresponding to the data dimensions related thereto. The predictive features 410 and the predictive labels 420 may collectively define the training data 260 as per the performance metrics.

At step 706, a classification model 265 is trained based on the training data 260. In an embodiment, the model trainer 240 in the model generator 140 may receive the training data 260 for training a classification model such as the classification model 265 to provide a trained data model such as the trained data model 270 based on supervised learning techniques. The trained data model 270 may operate to predict a potential issue related to an unresolved data item (e.g., a ticket, an outgoing message, a query, or a combination thereof). In one example, the trained data model 270 may be sent by the model trainer 240 to the action performer 150 for use during a live mode.

The data receiver 130 may receive multidimensional data such as the live data 215 during a live mode. The live data 215 may include an unresolved data item such as the unresolved data item 320, e.g., a service ticket, a query, an outgoing message or a message created in response to an issue or a data item, or a combination thereof. The unresolved data item 320 may include a set of attributes corresponding to multiple data dimensions. The set of attributes may relate to a category, a description, an identity indicator, and a creation date with the corresponding timestamp related to the unresolved data item 320. Similar to the resolved data item 310, the unresolved data item 320 may be preprocessed by the data receiver 130 to identify, segregate, and normalize various attributes or features thereof to provide preprocessed data 810, similar to the preprocessed data 220, related to different data dimensions. The preprocessed data 810 may be sent directly to the action performer 150, or alternatively, stored in a data repository such as the storage 615 for access or use by the action performer 150.

The action performer 150 may analyze the preprocessed data 810 based on the trained data model 270 to predict a potential issue related to the live data 215. The preprocessed data 810 may be analyzed based on the performance metrics used for obtaining the training data 260. That is, the action performer 150 may perform a statistical analysis of the preprocessed data 810 based on the trained data model 270 that may be trained earlier using the training data 260. In an embodiment, the trained data model 270 may operate to identify multiple data dimensions corresponding a potential issue related to the unresolved data item 320. For example, the trained data model 270 may compare the attributes or features pertaining to the data dimensions in the preprocessed 810 with respective threshold values in the performance metrics. Based on values of the attributes or features exceeding the respective performance metrics, the trained data model 270 may identify a single data dimension, e.g., whose maximum attributes exceed the respective threshold values, being vulnerable to have a potential issue. The trained data model 270 may accordingly classify the unresolved data item 320 into one or more priority groups for the identified data dimension. The priority groups may correspond to, without limitation, an age, escalation metrics, and a sentiment related to the performance metrics.

In one instance, when the potential issue or the data dimension may be predicted as being related to the temporal data, the trained data model 270 may classify the unresolved data item 320 and the related feature(s) into the age priority group. In another instance, when the potential issue or the data dimension may be predicted as being related to the service data, the text data, and/or the performance data, the trained data model 270 may classify the unresolved data item 320 and the related feature(s) into the escalation priority group and the sentiment priority group. In yet another instance, when the potential issue may be predicted as being related to the text data and/or the performance data, the trained data model 270 may classify the unresolved data item 320 and the related feature(s) into the escalation priority group and the sentiment priority group, and so on. Based on the priority groups or the classification, the trained data model 270 may provide a trigger for the action performer 150 to perform a predefined action. In an embodiment, the action performer 150, upon operating in the push mode, may provide an output directly to an output device, such as the output device 625, for example, of an agent or a helpdesk manager based on the trigger. Such output may include manipulating a position of the unresolved data item 320 in an item queue or a priority queue, adjusting an existing rank of or assigning a new rank to the unresolved data item 320 in any such queues, and providing an auto-alert indication (e.g., a pop-up window, an email, an SMS, etc.) regarding the unresolved data item 320 to the output device 625. Alternatively, upon operating in the pull mode, the action performer 150 may store such output to the storage 615 from where the output device 625 may fetch the output on demand.

Figure 9:
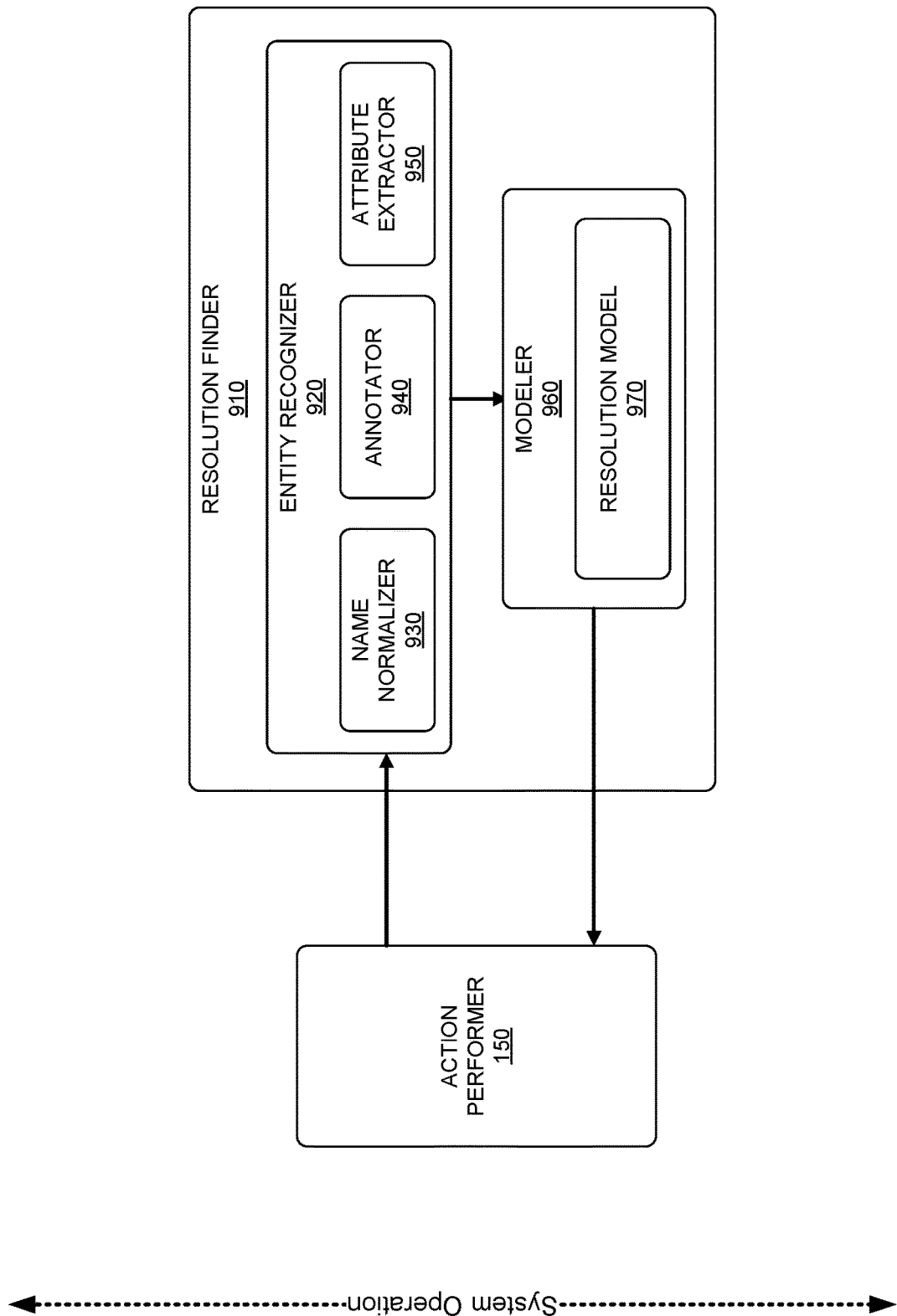
FIG. 9 illustrates a resolution finder configurable by the system of FIG. 1, according to an example of the present disclosure.

In another embodiment, as illustrated in FIG. 9, the action performer 150 may provide the unresolved data item 320 to another component or device for configuring a data model to (i) predict a resolution, or (ii) recommend or initiate a predefined resolution for the predicted potential issue.

In an example, the action performer 150 may operate with a resolution finder 910 including one or more components such as an entity recognizer 920 including sub-components such as a name normalizer 930, an annotator 940, and an attribute extractor 950; and a modeler 960 including a resolution model 970. In a first instance, the resolution finder 910 may use the unresolved data item 320 for configuring or training the resolution model 970 for predicting a resolution for the potential issue. For this, the entity recognizer 920 may preprocess the unresolved data item 320. That is, the name normalizer 930 may normalize the data in the unresolved data item 320 based on a semantic dictionary to replace a term and/or a symbol, reorder jumbled terms, and/or eliminate a redundant term using any suitable techniques known in the art and provide normalized data. The annotator 940 may preprocess the normalized data for annotation using any of a variety of natural language preprocessing techniques known in the art to provide preprocessed data and annotate the preprocessed data based a language descriptor of a particular natural language in the unresolved data item 320 to provide the annotated data. Examples of these preprocessing techniques may include, but are not limited to, sentence tokenization, word tokenization, lemmatization, stemming, stop word removal, spell-check, and special character removal. In some instances, such preprocessed data may be additionally or alternatively annotated by a human operator. The attribute extractor 950 may identify and/or extract general features or attributes from the annotated data using any of a variety of standard feature extraction models known in the art including the bag-of-words, collocation, and POS tagging models. For example, the attribute extractor 950 may parse text in the annotated data based on an n-gram model, where the n-gram may refer to a sequence of terms in the text. Only terms corresponding to n-grams, which may be defined in a preset natural language corpus may be modeled, instead of all possible n-grams. Such natural language corpus may refer to the American National Corpus (ANC), the Corpus of Contemporary American English (COCA), or any similar commercial or private natural language term database. The extracted features or attributes may then be used by the modeler 960 for configuring or training the resolution model 970 for predicting a resolution for the potential issue. The trained resolution model 970 may be sent back to the action performer 150, which may store the resolution model 970 in the storage 615.

In a second instance, the resolution finder 910 may use the unresolved data item 320 for predicting a resolution for the potential issue based on the trained resolution model 970 and provide the predicted resolution back to the action performer 150, which may either send the predicted resolution as a recommendation or an indication to the output device 625 via the push mode or store the predicted resolution in the storage 615. The output device 625 may fetch the predicted resolution from the storage 615 during the pull mode. In other instances, the action performer 150 may directly initiate or implement the predicted resolution for the potential issue related to the unresolved data item 320. In some embodiments, aspects of the resolution finder 910 may be integrated with the system 110. For example, aspects of the entity recognizer 920 may at least in-part be integrated with the data receiver 130. In another example, aspects of the modeler 960 may at least in-part be integrated with the model generator 140 and/or the action performer 150.

The present disclosure provides for the system 110 to analyze multidimensional data for issue prediction. The present disclosure assists to predict a potential issue with input data, for example, an open or unresolved ticket, based on multiple data dimensions, instead of relying on a single data dimension, related therewith, thereby improving the accuracy of issue prediction as per preset metrics. The present disclosure may also prioritize the input data, or a resolution thereof, based on the corresponding data dimensions being related to the preset metrics before allocating, resolving, or closing the input data, thereby assisting to avoid delays, complaints, or escalations. The present disclosure may further assist to auto-check incoming or outgoing messages and provide auto-alerts to ensure satisfactory responses to the potential issue and/or the input data. Moreover, the present disclosure may assist to manipulate a position of the input data in a priority queue, adjust or assign a rank to the input data, initiate a preset resolution for the potential issue, and/or configure a data model for predicting a resolution for the potential issue to enable proactive management of intended service or process and minimize, or eliminate, any adverse impact due to service or process related disruptions. Accordingly, the present disclosure may assist to effectively analyze a data item, e.g., a service ticket; identify a data item requiring prioritization based on a potential issue, or corresponding categories, related thereto; provide a recommendation and/or a resolution on the prioritized data item associated with a priority group related to the preset metrics; and provide a proactive notification or resolution for a data item per priority group related to the preset metrics. The present disclosure may also provide a unique end-to-end solution to enhance customer satisfaction and implement a process improvement as a preventive action.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system to automate a resolution process associated with multidimensional data items using predictive analysis, comprising:

a processor; and
a model generator coupled to the processor, the model generator to:
receive, by a communication interface, a resolved data item relating to a service issue via a network, the resolved data item including a set of attributes corresponding to a plurality of predefined data dimensions, wherein the set of attributes relate to a historical resolution for the service issue, a category related to the service issue, a description of the service issue, an identity indicator, and a creation date with a first timestamp related to the resolved data item;
preprocess, by the processor, the resolved data item for generating a preprocessed data, wherein the resolved data item is preprocessed by:
  obtaining one of a log-normal and a near normal distribution of the set of attributes by adjusting, each of the set of attributes to a skewed data based on long transformation techniques;
  forecasting future states of the set of attributes by evaluating the set of attributes against respective predefined performance metrics using one of moving averages and an autoregressive integrated moving average (ARIMA) technique;
  filtering numerical attributes from the set of attributes;
  segregating the set of attributes into one of numerical attributes and categorical attributes based on the predefined performance metrics;
  obtaining numerical representations of the categorical attributes for statistical analysis based on one of dummy encoding technique and one-hot encoding technique;
  normalizing a natural language text for the set of attributes based on one of a sentence tokenization, a word tokenization, a lemmatization, a stemming, a stop word removal, a spell-check, a special character removal, and part-of-speech (POS) tagging techniques; and
  normalizing the set of attributes using data sufficiency and accuracy threshold techniques to generate the preprocessed data;
transform, by the processor, the preprocessed data into a metadata corresponding to the plurality of predefined data dimensions based on the predefined performance metrics;
adjust, by the processor, a population of attributes in the set of attributes based on a plurality of data models including a statistical data model and a deep learning data model operating independent of each other,
wherein to adjust the population of the attributes, the processor is configured to:
  generate a predictive feature by operating on the set of attributes by the statistical data model,
  execute, by the deep learning data model, a grid search to stack multiple layers of the preprocessed data requiring focus on specific categories relative to other categories of attributes of the set of attributes as per the predefined performance metrics, wherein the deep learning data model includes a partial autoencoder that compresses features of the preprocessed data by focusing on the specific categories based on the grid search, and
  generate a predictive label based on the predefined performance metrics related to the plurality of predefined data dimensions based on the compressed features, and wherein the predictive feature and the predictive label collectively define training data;

train, by the processor, a classification model based on the training data, to provide a trained data model predicting a potential issue related to an unresolved data item, wherein the trained data model provides a trigger based on the potential issue being related to the predefined performance metrics used for obtaining the training data; and an action performer coupled to the processor, in response to the trigger, the action performer to:

classify, by the processor, the unresolved data item into a priority group related to the predefined performance metrics, wherein the priority group corresponds to one of an age, an escalation, and a sentiment, wherein the performance metrics are related to internal and external control objectives of a process, wherein the internal control objectives relate to one of a reliability of a process, a timely update on achievement of operational and strategic goals, and compliance with laws and regulations; and perform, by the processor, a predefined action based on the priority group associated with the unresolved data item, the predefined action comprising at least one of:

configuring a data model for predicting a resolution for the potential issue;

manipulating a position of the unresolved data item in a predefined queue;

assigning a rank to the unresolved data item based on the priority group;

communicating at least one of the potential issue and the unresolved data item to a predefined device; and initiating the resolution associated with the priority group and the potential issue.

2. The system of claim 1, wherein the statistical data model and the deep learning data model operate simultaneously.

3. The system of claim 1, wherein the set of attributes further relate to at least one of a historical resolution date with a second timestamp, a geographical indicator, a satisfaction indicator, and a revenue indicator related to one of a user and an entity associated with the resolved data item.

4. The system of claim 1, wherein the resolved data item includes one of a service ticket, a message, and a query, or a combination thereof.

5. The system of claim 1, wherein the unresolved data item includes an attribute corresponding to the set of attributes associated with the resolved data item, and wherein the unresolved data item includes an outgoing message created in response to the potential issue.

6. The system of claim 1, wherein the plurality of predefined data dimensions includes temporal data, service data, natural language text data, and performance data, wherein the service data comprises at least one of a service process, a service category, a service sub-category, a service issue category, and a service issue sub-category, and wherein the performance data comprises at least one of a volume of data items corresponding to the service issue, revenue data, and year-to-date satisfaction data related to one of a user and an entity, wherein each of the service data and the performance data corresponds to target values as per the respective predefined performance metrics.

7. A method to automate a resolution process associated with multidimensional data items using predictive analysis, comprising:

receiving, by a communication interface, a resolved data item relating to a service issue via a network, the resolved data item including a set of attributes corresponding to a plurality of predefined data dimensions, wherein the set of attributes relate to a historical resolution for the service issue, a category related to the service issue, a description of the service issue, an identity indicator, and a creation date with a first timestamp related to the resolved data item;

preprocessing, by the processor, the resolved data item for generating a preprocessed data, wherein the resolved data item is preprocessed by:

obtaining, by the processor, one of a log-normal and a near normal distribution of the set of attributes by adjusting, each of the set of attributes to a skewed data based on log-transformation techniques;

forecasting, by the processor: future states of the set of attributes by evaluating the set of attributes against respective predefined performance metrics using one of a moving average and an autoregressive integrated moving average (ARIMA) technique;

filtering, by the processor, numerical attributes from the set of attributes;

segregating, by the processor, the set of attributes into one of numerical attributes and categorical attributes based on the predefined performance metrics;

obtaining, by the processor, numerical representations of the categorical attributes for statistical analysis based on one of dummy encoding and one-hot encoding techniques;

normalizing, by the processor, natural language text for the set of attributes based on one of a sentence tokenization, a word tokenization, a lemmatization, a stemming, a stop word removal, a spell-check, a special character removal, and part-of-speech (POS) tagging techniques; and normalizing, by the processor, the set of attributes using data sufficiency and accuracy threshold techniques to generate the preprocessed data;

transforming, by the processor, the preprocessed data into a metadata corresponding to the plurality of predefined data dimensions based on the predefined performance metrics;

adjusting, by the processor, a population of attributes in the set of attributes based on a plurality of data models including a statistical data model and a deep learning data model operating independent of each other, wherein to adjust the population of the attributes, the processor is configured to:

generate a predictive feature by operating on the set of attributes by the statistical data model, execute, by the deep learning data model, a grid search to stack multiple layers of the preprocessed data requiring focus on specific categories relative to other categories of attributes of the set of attributes relative to other categories as per the predefined performance metrics, wherein the deep learning data model includes a partial autoencoder that compresses features of the preprocessed data by focusing on the specific categories based on the grid search, and generate a predictive label based on the predefined performance metrics related to the plurality of predefined data dimensions based on the compressed features, and wherein the predictive feature and the predictive label collectively define training data;

training, by the processor, a classification model based on the training data, to provide a trained data model predicting a potential issue related to an unresolved data item, wherein the trained data model provides a trigger based on the potential issue being related to the predefined performance metrics used for obtaining the training data;

classifying, by the processor, the unresolved data item into a priority group related to the predefined performance metrics, wherein the priority group corresponds to one of an age, an escalation, and a sentiment, wherein the performance metrics are related to internal and external control objectives of a process, wherein the internal control objectives relate to one of a reliability of a process, a timely update on achievement of operational and strategic goals, and compliance with laws and regulations; and performing, by the processor, a predefined action based on the priority group associated with the unresolved data item, the predefined action comprising at least one of:
configuring, by the processor, a data model for predicting a resolution for the potential issue;
manipulating, by the processor, a position of the unresolved data item in a predefined queue;
assigning, by the processor, a rank to the unresolved data item based on the priority group;
communicating, by the processor, at least one of the potential issue and the unresolved data item to a predefined device; and
initiating, by the processor, the resolution associated with the priority group and the potential issue.

8. The method of claim 7, wherein the statistical data model and the deep learning data model operate simultaneously.

9. The method of claim 7, wherein the set of attributes further relate to at least one of a historical resolution date with a second timestamp, geographical indicator, a satisfaction indicator, and a revenue indicator related to one of a user and an entity associated with the resolved data item.

10. The method of claim 7, wherein the resolved data item includes one of a service ticket, a message, and a query, or a combination thereof.

11. The method of claim 7, wherein the unresolved data item includes an attribute corresponding to the set of attributes associated with the resolved data item, and wherein the unresolved data item includes an outgoing message created in response to the potential issue.

12. The method of claim 7, wherein the plurality of predefined data dimensions comprise a temporal data, a service data, a natural language text data, and a Performance data wherein the service data comprises at least one of a service process, a service category, a service sub-category, a service issue category, and a service issue sub-category, and wherein the performance data comprises at least one of a volume of data items corresponding to the service issue, revenue data, and year-to-date satisfaction data related to one of a user and an entity, wherein each of the service data and the performance data corresponds to target values as per the respective predefined performance metrics.

13. A non-transitory computer readable medium comprising machine executable instructions to automate a resolution process associated with multidimensional data items using predictive analysis that are executable by a processor to:
receive, from a communication interface, a resolved data item relating to a service issue via a network, the resolved data item including a set of attributes corresponding to a plurality of predefined data dimensions, wherein the set of attributes relate to a historical resolution for the service issue, a category related to the service issue, a description of the service issue, an identity indicator, and a creation date with a first timestamp related to the resolved data item;
preprocess the resolved data item for generating a preprocessed data, wherein the resolved data item is preprocessed by:
obtaining one of a log-normal and a near normal distribution of the set of attributes by adjusting, each of the set of attributes to a skewed data based on log-transformation techniques;
forecasting future states of the set of attributes by evaluating the set of attributes against respective predefined performance metrics using one of moving averages and an autoregressive integrated moving average (ARINfA) technique;
filtering numerical attributes from the set of attributes;
segregating the set of attributes into one of numerical attributes and categorical attributes based on the predefined performance metrics;
obtaining numerical representations of the categorical attributes for statistical analysis based on one of dummy encoding and one-hot encoding techniques;
normalizing natural language text for the set of attributes based on one of a sentence tokenization, a word tokenization, a lemmatization, a stemming, a stop word removal, a spell-check, a special character removal, and part-of-speech (POS) tagging techniques; and
normalizing the set of attributes using data sufficiency and accuracy threshold techniques to generate the preprocessed data;
transform the preprocessed data into a metadata corresponding to the plurality of predefined data dimensions based on the predefined performance metrics;
adjust a population of attributes in the set of attributes based on a plurality of data models including a statistical data model and a deep learning data model operating independent of each other,
wherein to adjust the population of the attributes, the processor is configured to:
generate a predictive feature by operating on the set of attributes by the statistical data model
execute, by the deep learning data model, a grid search to stack multiple layers of the preprocessed data requiring focus on specific categories relative to other categories of attributes of the set of attributes as per the predefined performance metrics, wherein the deep learning data model includes a partial autoencoder that compresses features of the preprocessed data by focusing on the specific categories based on the grid search, and
generate a predictive label based on the predefined performance metrics related to the plurality of predefined data dimensions based on the compressed features, and
wherein the predictive feature and the predictive label collectively define training data;
train a classification model based on the training data, to provide a trained data model predicting a potential issue related to an unresolved data item, wherein the trained data model provides a trigger based on the potential issue being related to the predefined performance metrics used for obtaining the training data;

classify the unresolved data item into a priority group related to the predefined performance metrics, wherein the priority group corresponds to one of an age, an escalation, and a sentiment, wherein the performance metrics are related to internal and external control objectives of a process, wherein the internal control objectives relate to one of a reliability of a process, a timely update on achievement of operational and strategic goals, and compliance with laws and regulations; and perform a predefined action based on the priority group associated with the unresolved data item, the predefined action comprising at least one of:
configuring a data model for predicting a resolution for the potential issue:
manipulating a position of the unresolved data item in a predefined queue;
assigning a rank to the unresolved data item based on the priority group;
communicating at least one of the potential issue and the unresolved data item to a predefined device; and
initiating the resolution associated with the priority group and the potential issue.

14. The non-transitory computer readable medium of claim 13, wherein the statistical data model and the deep learning data model operate simultaneously.

15. The non-transitory computer readable medium of claim 13, wherein the set of attributes further relate to at least one of a historical resolution date with a second timestamp, a geographical indicator, a satisfaction indicator, and a revenue indicator related to one of a user and an entity associated with the resolved data item.

16. The non-transitory computer readable medium of claim 13, wherein the resolved data item includes one of a service ticket, a message, and a query, or a combination thereof.

17. The non-transitory computer readable medium of claim 13, wherein the unresolved data item includes an attribute corresponding to the set of attributes associated with the resolved data item, and wherein the unresolved data item includes an outgoing message created in response to the potential issue.

* * * * *